United States Patent
Large

(10) Patent No.: US 7,145,548 B2
(45) Date of Patent: Dec. 5, 2006

(54) BIOMECHANICALLY LOW LOAD COMPUTER MOUSE

(75) Inventor: Thomas Large, Hempstead, NY (US)

(73) Assignee: Torbay Holdings, Hempstead, NY (US)

( * ) Notice: Subject to any disclaimer, the term of this patent is extended or adjusted under 35 U.S.C. 154(b) by 75 days.

(21) Appl. No.: 10/453,773

(22) Filed: Jun. 3, 2003

(65) Prior Publication Data
US 2004/0246231 A1   Dec. 9, 2004

(51) Int. Cl.
G09G 5/00  (2006.01)

(52) U.S. Cl. ............ 345/156; 345/163; 345/164; 345/157; 345/158

(58) Field of Classification Search ......... 345/156, 345/163–164, 157–158
See application file for complete search history.

(56) References Cited

U.S. PATENT DOCUMENTS

| 4,862,165 A | 8/1989 | Gart |
| 5,157,381 A | 10/1992 | Cheng |
| 5,355,147 A * | 10/1994 | Lear ............ 345/156 |
| 5,576,733 A | 11/1996 | Lo |
| 5,841,425 A * | 11/1998 | Zenz, Sr. ......... 345/163 |
| 5,894,302 A * | 4/1999 | Scenna et al. ...... 345/163 |
| 5,982,356 A * | 11/1999 | Akiyama ........... 345/161 |
| 6,396,478 B1 * | 5/2002 | Kravtin et al. ...... 345/163 |
| 6,489,947 B1 * | 12/2002 | Hesley et al. ...... 345/163 |

FOREIGN PATENT DOCUMENTS

| DE | 19713594 | 10/1997 |
| EP | 1 182 606 | 2/2002 |
| EP | 1 182 606 A2 * | 2/2002 |
| GB | 2328496 A | 2/1999 |

* cited by examiner

*Primary Examiner*—Richard Hjerpe
*Assistant Examiner*—Leonid Shapiro
(74) *Attorney, Agent, or Firm*—Jennifer Meredith; Meredith & Keyhani, PLLC

(57) ABSTRACT

A mouse which truly performs at a low load level, significantly reducing high statistics rates of damaged muscle tissue and severe injury. The mouse does not require lifting to get back into sync and can adjust to the varying hand structure of different users, and apply contour in effective areas as to support the hand in such a way that strain is concentrated on the larger muscles of the lower arm rather than specific muscles of the wrist and fingers.

53 Claims, 7 Drawing Sheets

FIGURE 5 step 1000 providing a base with a top portion and a bottom portion, wherein the top portion has a first cavity therein an first adjustment assembly, a second cavity containing therein second adjustment assembly and the bottom portion is substantially flat for movement across a planar surface

Step 1002 providing a first housing with an inner surface and outer surface, wherein the inner surface and the outer surface have a plurality of curved regions adapted to receive a portion of the of a users hand, wherein the first housing contains a portion of the first adjustment assembly and the first adjustment assembly senses the size and placement of the users hand and adjusts the first housing accordingly.

Step 1004 providing a second housing with a second inner surface and a second outer surface, wherein the second inner surface and the second outer surface have a plurality of curved regions for the receipt of a portion of the users hand, wherein the second housing contains a portion of the second adjustment assembly and the second adjustment assembly senses the size and placement of a users hand and adjusts the second housing accordingly.

Step 1006 may be providing a sensor contained within the mouse and in communication with a computer controlled program, wherein the sensor detects the presence of a users hand and allows the mouse to operate only when the users hand is in communication with the mouse.

Step 1008 forming a mound portion and a fully portion with the first housing and the second housing form. The gully portion adapted to received at least a portion of one of the hypothenar eminence, wrist and outer portion of the little finger.

Step 1010 providing a vertically adjustable thumb rest extending from the outer portion of the first housing.

Step 1012 automatically sensing the position of the users thumb and adjusting the thumb rest.

Step 1014 automatically sensing the position of the users hand and adjusting the first housing accordingly.

Step 1016 automatically sensing the position of the users hand and adjusting the second housing accordingly.

Step 1018 providing a biometric sensor adapted to continuously identify the present user of the mouse and adjust the first housing and the second housing accordingly.

BIOMECHANICALLY LOW LOAD COMPUTER MOUSE

BACKGROUND OF THE INVENTION

The present invention generally relates to computer input devices, namely those which require the interaction between user, arm, and hand including mice, joysticks, and pens. The disclosed invention attempts to reestablish the true meaning of an ergonomic device as that which induces a low biomechanical load on the user. Specifically, biomechanically low load is in reference to the human arm, hand in coordination with the current invention.

Conditions of low load, regarding physical human movement, can be derived of two components: the physical structure and "grip" required of the arm and hand by the device, as well as the motion of the hand and arm system required described in both magnitude and form. Low load, with regards to the "grip" of the hand is known within the art as deviance from the rest position of the arm and hand. The rest position is known to be the structure of the arm and hand in a standing position, not tensed and unaffected. The rest position of the hand can be described, generally, as a handshake position, with thumbs and fingers facing downward, fingers curled pointing towards the body. This structure establishes the ideal ergonomic structure. However, prior art mice generally do not provide for mousing with the hand in an at rest position. Furthermore, the extent of physical deviation from this position may be known as strain.

As far as the motion of the hand and arm, several factors are derivative. First, it is known within the art that although some movement is necessary and beneficial over a period of time of usage, ideally, stress should be avoided throughout the fine motor control muscles of the lower hand, and preferably applied to the larger muscles of the upper arm.

It is with respect to these parameters that the current invention can be compared understandably over prior art. For instance, in U.S. Pat. No. 5,355,147 issued to Lear, a device of vertical orientation is taught. However, all fingers of the hand are required to grip the mouse. In addition, the wrist support inflects the hand in an upward motion. This invention induces strain on the user in both manners. The necessity to clench and support the mouse with all fingers, as well as the wrist support in an altering position, leads to a clear deviation from the ideal position previously described.

Additionally, U.S. Pat. No. 5,576,733 issued to Lo discloses an invention, which improves upon that of Lear by securely gripping the device, vertically, by consisting of a housing structure with two simple sides. One side allows for placement of the thumb as the other side allows for placement of the fingers. Control is improved by giving the user the ability to move the pointer by flexing either the thumb or fingers more so than the entire arm or wrist. Thus, the ideal arm and hand motion, as described earlier, is violated at the expense of better control.

Also known within the art are hand controller devices, such as U.S. Pat. No. 4,862,165 issued to Gart, which attempts to provide an "ergonomic" device. The '165 patent fails to provide support for the vertical orientation of the hand of the user. Thus, once again, the ideal low load position is violated.

Also known within the art, are devices known as trackballs and combinations of trackballs and mice. U.S. Pat. No. 6,292,175 issued to Sheehan discloses such a device. In this patent, Sheehan teaches a mouse similar to that Gart with respect to hand orientation. However, a trackball is provided to negate the necessity for large arm and wrist movements. This, however, gives rise to repetitive, lengthy use of the weak muscles of the thumb and fingers and creates torque within the lower arm due to the lack of a vertical orientation.

Another problem with prior art mousing devices is the requirement to lift the mouse when the apparatus goes out of sync. Currently, when a mouse goes out of sync the user has to lift the mouse back to center or the desired position. This may be extremely difficult for individuals with hand injuries.

As can be seen, there is a need within the art for a hand controlled pointing device, which truly performs at a low load level, significantly reducing high statistics rates of damaged muscle tissue and severe injury. Also, a mouse which does not require lifting to get back into sync. There is also a need for a hand pointing device which can adjust to the varying hand structure of different users. Additionally, there is a need for a device which may apply contour in effective areas, and support the hand in such a way that strain is concentrated on the larger muscles of the lower arm rather than specific muscles of the wrist and fingers.

SUMMARY OF THE INVENTION

The present invention provides a biomechanically low load mouse and methods for providing an automatically adjustable grip-less and biomechanically low load. Such apparatus and method are useful for general comfort, individuals with arthritis, and preventing carpal tunnel syndrome and other repetitive disorders.

According to one embodiment, a mouse apparatus is disclosed that does not require gripping comprising: a base, configured to be placed on a working surface, a housing, with an inner surface and an outer surface, the outer surface having a thumb ledge; and a second housing with a bottom surface, a second inner surface, and a second outer surface, wherein the bottom surface is in adjustable communication with the base.

According to yet another aspect of the present invention, an ergonomic computer mouse for translation over a horizontal stationary surface is disclosed, the mouse comprising: a generally horizontal bottom surface for stably and translatably positioning the mouse over a horizontal surface; a first housing attached over the bottom surface, the first housing having an inner surface and an outer surface, wherein the inner surface has a plurality of curved regions and the outer surface has a thumb-supporting surface; a second housing movably attached over the bottom surface, the second housing having a second inner surface and a second outer surface, the second inner surface having a plurality of curved regions, wherein the inner surface and the second inner surface form a mound region and a gully region, so that the hand of the user rests upon the mound region and the mouse is easily maneuvered while the hand is in a natural and relaxed position.

According to a still further aspect of the present invention, an ergonomic mouse apparatus is disclosed, the apparatus comprising: a base with a bottom side and a top side, wherein the bottom side is adapted to contact a planar working surface; a first housing in fixed communication with top side of the base, having: an inner surface comprising a plurality of continuous curved regions extending the length of the inner surface in fixed connection with the top side of the base; an outer surface opposing the inner surface, having a plurality of continuous curved regions including a thumb ledge region, a thumb height adjuster in fixed communication with the thumb ledge region and a concave thumb rest; a second housing in adjustable communication with the top side of the base in communication with the outer portion of the hand of the user, wherein the second housing includes a second inner surface having a second plurality of curved regions and a second outer surface opposing the second inner surface, wherein the plurality of continuous curved regions of the inner surface of the first housing and the plurality of continuous curved regions of the inner surface of the second housing form a mound portion and a gully portion, so that at least a portion of the wrist, hypothenar eminence and outer portion of the little finger of a user rests in the gully portion, and the fingers may easily make contact with the mound portion such that the mouse is easily maneuvered while the hand is in a natural and relaxed position; and a sensor that can sense the presence and size of a users hand, adjusting the position of the first housing and second housing and only allowing for mousing when the users hand is present.

According to yet another aspect of the present invention, a method for providing an automatically adjustable grip-less and biomechanically low load mouse is disclosed, the method comprising the steps of: providing a base with a top portion and a bottom portion, wherein the top portion has a first cavity therein a first adjustment assembly; a second cavity containing therein second adjustment assembly and the bottom portion is substantially flat for movement across a planar surface; providing a first housing with an inner surface and outer surface, wherein the inner surface and the outer surface have a plurality of curved regions adapted to receive a portion of the of a users hand, wherein the first housing contains a portion of the first adjustment assembly and the first adjustment assembly senses the size and placement of the users hand and adjusts the first housing accordingly; and providing a second housing with a second inner surface and a second outer surface, wherein the second inner surface and the second outer surface have a plurality of curved regions for the receipt of a portion of the users hand, wherein the second housing contains a portion of the second adjustment assembly and the second adjustment assembly senses the size and placement of a users hand and adjusts the second housing accordingly.

These and other features, aspects and advantages of the present invention will become better understood with reference to the following drawings, description and claims.

BRIEF DESCRIPTION OF THE DRAWINGS

FIG. 5 depicts a method according to the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The current invention may relate to the field of computer input devices. However, the embodiment described herein discloses a device referred to as a mouse, commonly within the art. The device depicted is illustrated in terms of its physical attributes in consideration that the electrical and computer components are common and well known within the art. Additionally, the device depicted represents a right-handed embodiment. It should be understood that the invention could readily be configured for a left-handed user, by simply applying the mirror image.

Figure 1:
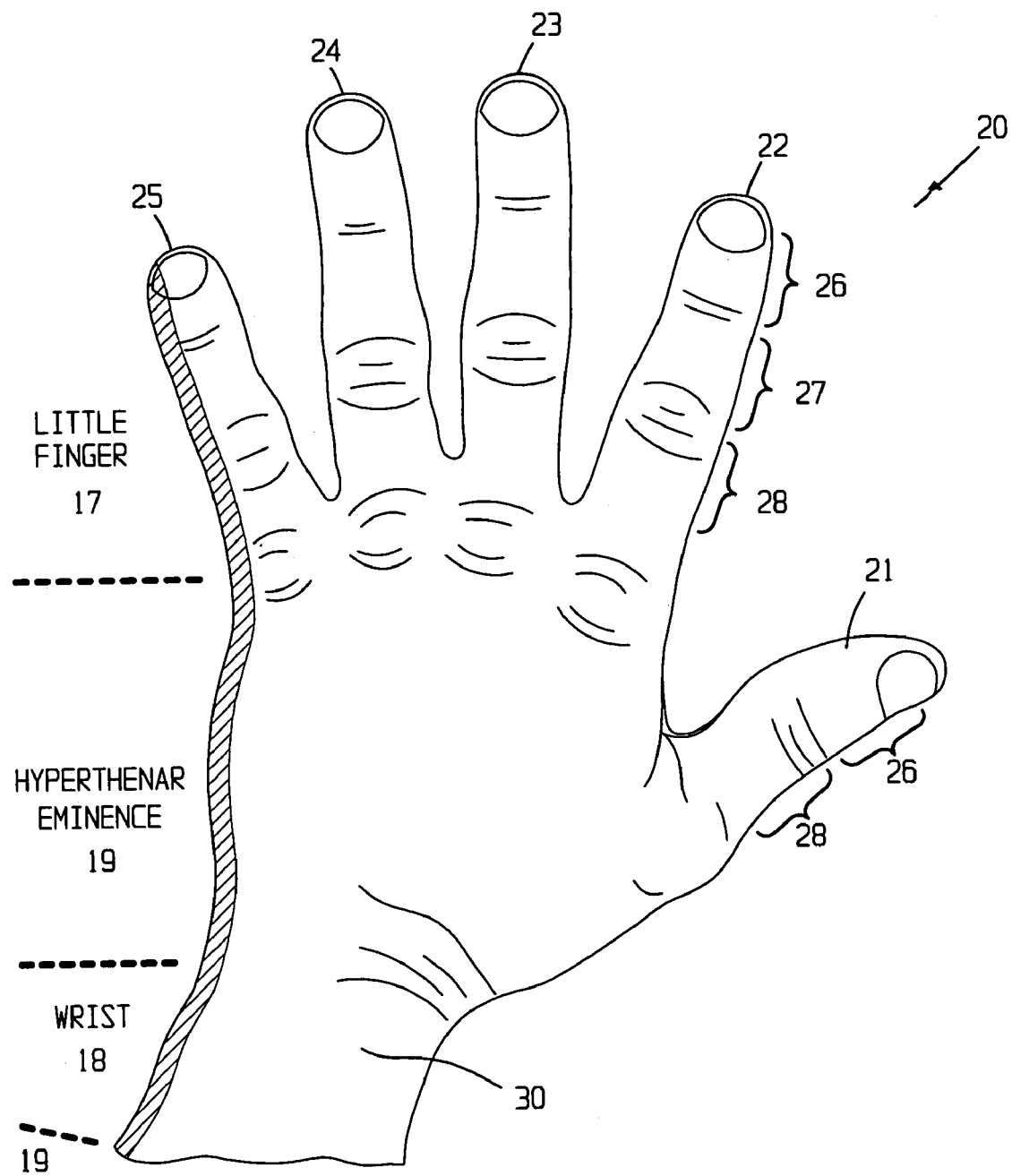
FIG. 1 depicts a human hand.

FIG. 1 depicts a left hand 20 having a first digit or thumb 21, second digit 22, third digit 23, fourth digit 24, and fifth digit 25. Each of the second through fifth digits 22–25 has three phalanges, including a distal phalange 26, a middle phalange 27, and a proximal phalange 28. The thumb 21 has a distal phalange 26 and a proximal phalange 28. The metacarpal and carpal bones extend between the five digits 21–25 and the wrist 30. FIG. 1 shows a contact regions 43 and 41. The little finger 17, hyperthenar eminence 19 and the wrist 18 and 'possibly' lower forearm 19. Subject to the users own hand orientation the contact area with buttons will vary, but typically be the finger tip 17. The weight of the user hand on the mouse provides the mechanical opposition necessary to actuate buttons without using the opposing thumb. An individual incapacitated by the loss of the thumb can easily and successfully mouse with the device.

Figure 2A:
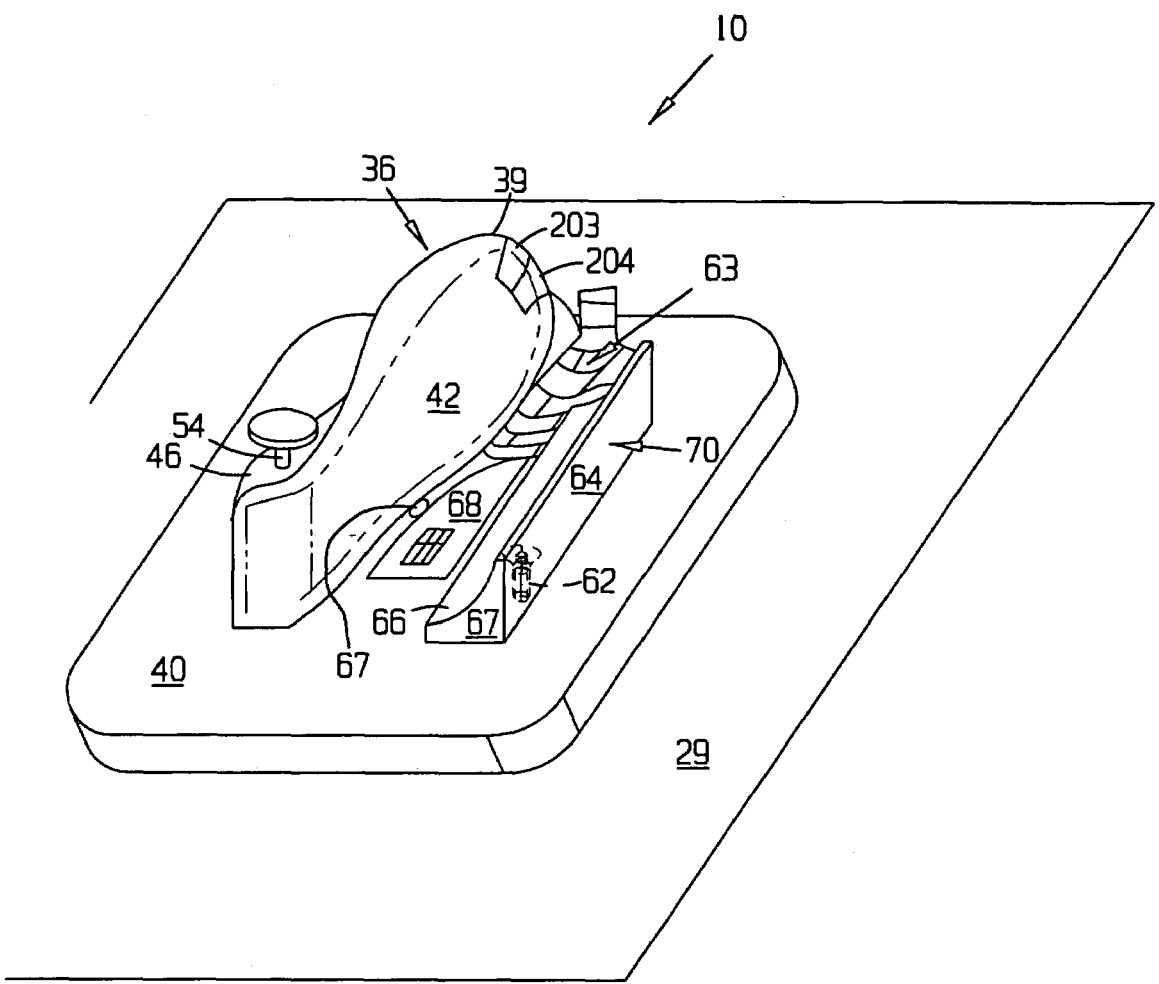
FIG. 2A depicts a schematic of the present invention according to one embodiment.

FIG. 2A depicts a mouse apparatus according to the present invention. The mouse does not require gripping and provides a low biomechanical load on the user's hand. The mouse apparatus 10 may be in electrical or optical connection with a computer, laptop or device within the field of computers. The apparatus 10 has a base 40, configured to be placed on a working surface 29. The working surface 29 may be a mouse pad, or any surface known within the art. The apparatus also has a first housing 36, wherein the first housing 36 has an inner surface 42 and an outer surface, the outer surface having a thumb ledge 46; and a second housing 70 with a bottom surface (not visible), a second inner surface 66, and a second outer surface 64, and wherein the bottom surface is in adjustable communication with the base 40. This is to say that the second housing 70 may translate along the base 40. This may be in any number of directions including a substantially horizontal direction. A substantially horizontal direction would be in a direction substantially parallel movement away or toward the first housing 36. There may also be a thumb rest 56 protruding from the thumb ledge 46. The thumb rest 56 may be concave and may also be adjustable in a substantially vertical direction to adjust for different thumb heights. For instance a child may require a much higher thumb rest 56 than an adult with larger hands. The thumb rest 56 may be manually or automatically adjusted. Where the thumb rest 56 is automatically adjusted it may be controlled by an electromechanical actuator within the apparatus 10. The relative positions of the first housing 36 and the second housing 70 can be dynamically adjusted by actuators acting under the control of a computer program. The second housing 70 may also be adjustable in a substantially vertical direction and automatically by an electromechanical actuator within the mouse device. The second housing 70 provides for a support for the backside of the human palm, in preventing the need for a "gripping" hand position. The second inside surface 66 is contoured to the backside of the human hand, similarly to the inside surface 42 of the first housing 36. The second housing 70 can be adjusted in both a vertical and horizontal manner. In this embodiment, a vertical adjustment is accounted for by means of a countersunk screw 62. Additionally, horizontal adjustment can be made through a connector device. In this embodiment, the connector device is a series of interlocking arches 63, connected through a pin. The connector device may be selected from the group consisting of interlocking arches, a hinge, adjustable screw, screw, frictional positioner, pins, and hinge and pin set. This device allows for a rotational adjustment of the second housing 70, horizontal with respect to the base 40. For increased support and comfort, a soft supportive material 68 is used, particular in firm connection with the base, preventing direct contact of the palm. The placement of the supportive material 68 is most effective at this position, but not limited to this position.

There may also be a hand-cushioning supportive material 68 in fixed contact with a portion or portions of the device. For example, the first housing 36, base 40, and/or second housing 70. The hand-cushioning supportive material may be foam, gel or any combination thereof. The inner surface 42 comprises a plurality of continuous curved regions extending the length of the inner surface 42 and the second inner surface 66 comprises a second plurality of curved regions so as to form a mound portion and a gully portion. The mound portion is formed from the first housing 36 and the gully portion is the space in between the first housing 36 and second housing 70.

According to a preferred embodiment, a sensor may be embedded in the base 40, first housing 36 or second housing 70. The sensor would sense the presence of a users hand and allow for mousing when the users hand is present. When the users hand is removed, the mouse would be deactivated. The term sensor encompasses a wide variety of devices that sense the presence of a trigger. The trigger may be the presence of the users hand, voice, sound, biometrics, etc.

A series of sensors may be installed within or upon the first housing 36. The functions of these sensors may include normal functions of mouse-clicking buttons (e.g., electrical switches) of existing pointing devices (e.g., computer mice) known within the art. Additionally, these sensors may include a fingerprint scanner, a retina scanner, or other biometric sensors. It may also be envisioned that the position of the surfaces (e.g., 42 and 66) of the mouse 10 and/or the functions, sensitivity, or status of the sensors of the device 10 may be controlled by voice recognition software, or by software operating in an operatively attached computer (not shown [or shown in FIG. 4]). Additionally, feedback as to the length of time the user's hand is left upon the mouse can be recorded and analyzed, so as to establish statistical patterns of use and to interact with software, such as software that analyses the time spent using the mouse and providing the user with recommendations as to taking breaks thereby. There may also be a connector device. The connector device may be chosen from the group consisting of interlocking arches, a hinge, adjustable screw, screw, frictional positioner, pins, and hinge and pin set. There may be hand-cushioning supportive material in fixed contact with the first housing, base, and second housing. There may also be a sensor 67 that can sense the presence of a users hand and allow for mousing when the users hand is present. The sensor may also act as a scroll, which has heretofore never been done. The sensor 67 may also be used to activate and deactivate mousing commands. For instance, if contact with the sensor 67 is removed the buttons 203 and 204 that usually act as left and right click change from being a 'left' or 'right' click to an 'up' or 'down' scroll. It should also be noted that the buttons (e.g. 203 and 204) are long buttons and are "center hinged", allowing for variations in users fingers. Re-establishing contact with the sensor makes them left and right again. Scrolling requires dexterity and grip in the finger of the user, which again may not be easy for those who cannot grip. Repetitive curling of the finger so as to make a scroll wheel scroll is biomechanically demanding. Touching sensors is not.

Figure 2B:
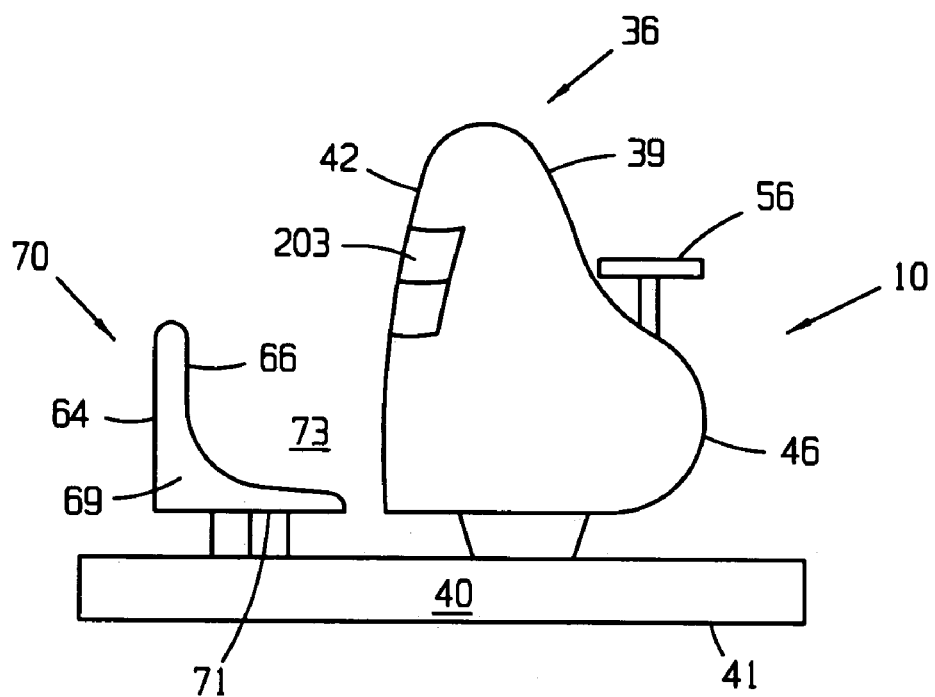
FIG. 2B depicts a front view of the apparatus according to the present invention.

FIG. 2B depicts an ergonomic computer mouse for translation over a horizontal stationary surface, the mouse comprising: a generally horizontal bottom surface 41 for stably and translatably positioning the mouse 10 over a horizontal surface such as a mouse pad or desk; a first housing 36 attached over the horizontal bottom surface 41. The first housing 36 having an inner surface 42 and an outer surface 39. The inner surface 42 has a plurality of curved regions and outer surface 39 has a thumb-supporting surface. The thumb supporting surface may be a thumb ledge 46 contoured to accept a human thumb, or may be a thumb ledge 46 with a thumb rest 56 protruding vertically therefrom. A second housing 70 is movably attached over the bottom surface 41. The second housing 70 having a second inner surface 66 and a second outer surface 64. The second inner surface 66 having a plurality of curved regions. The inner surface 42 and the second inner surface 66 form a mound region formed mostly of first housing 36 and a gully region 73 (formed mostly of the space between the first housing 36 and the second housing 70). The users hand rests upon the mound region including the first housing 36 and the mouse is easily maneuvered while the hand is in a natural and, in muscle activity terms, relaxed position. The position of the hand in that of a handshake, slightly tilted inward. The second housing 70 may be adjustable in many directions along the base. According to a preferred embodiment, the second housing 70 translates along the base 40 in a substantially horizontal direction. This is substantially parallel to the first housing 36. The relative positions of the first housing 36 and the second housing 70 can be dynamically adjusted by actuators acting under the control of a computer program. The second housing 70 may also be adjustable in a substantially vertical direction automatically by an electromechanical actuator within the mouse device.

Figure 2C:
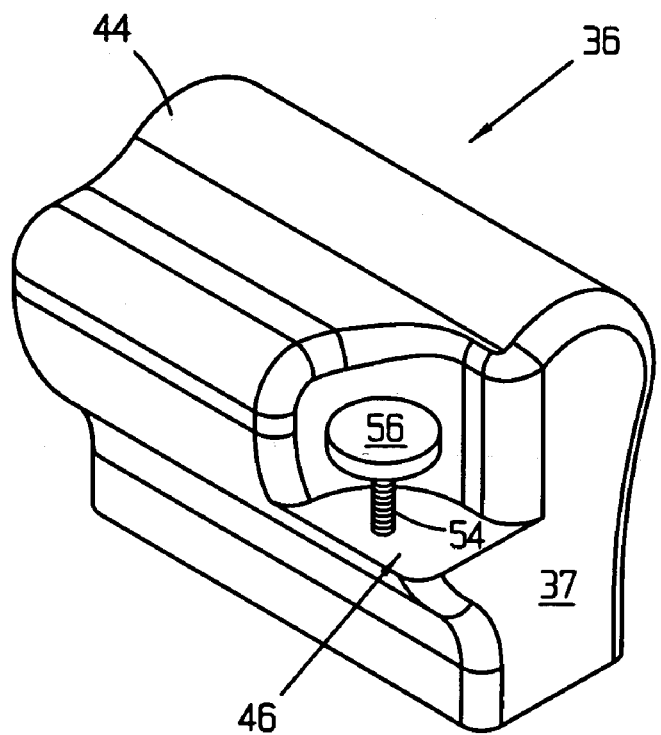
FIG. 2C depicts an elevational view of the apparatus according to the present invention.

Shown in greater detail in FIG. 2C, the thumb supporting surface may include a concave thumb ledge 46 and/or a thumb rest 56 having a height that is adjustable in a substantially vertical direction. The height may be adjustable manually or automatically by an electromechanical actuator within the mouse device. The thumb height adjuster 54 may be a simple screw that is manually or automatically raised and lowered.

Figure 2D:
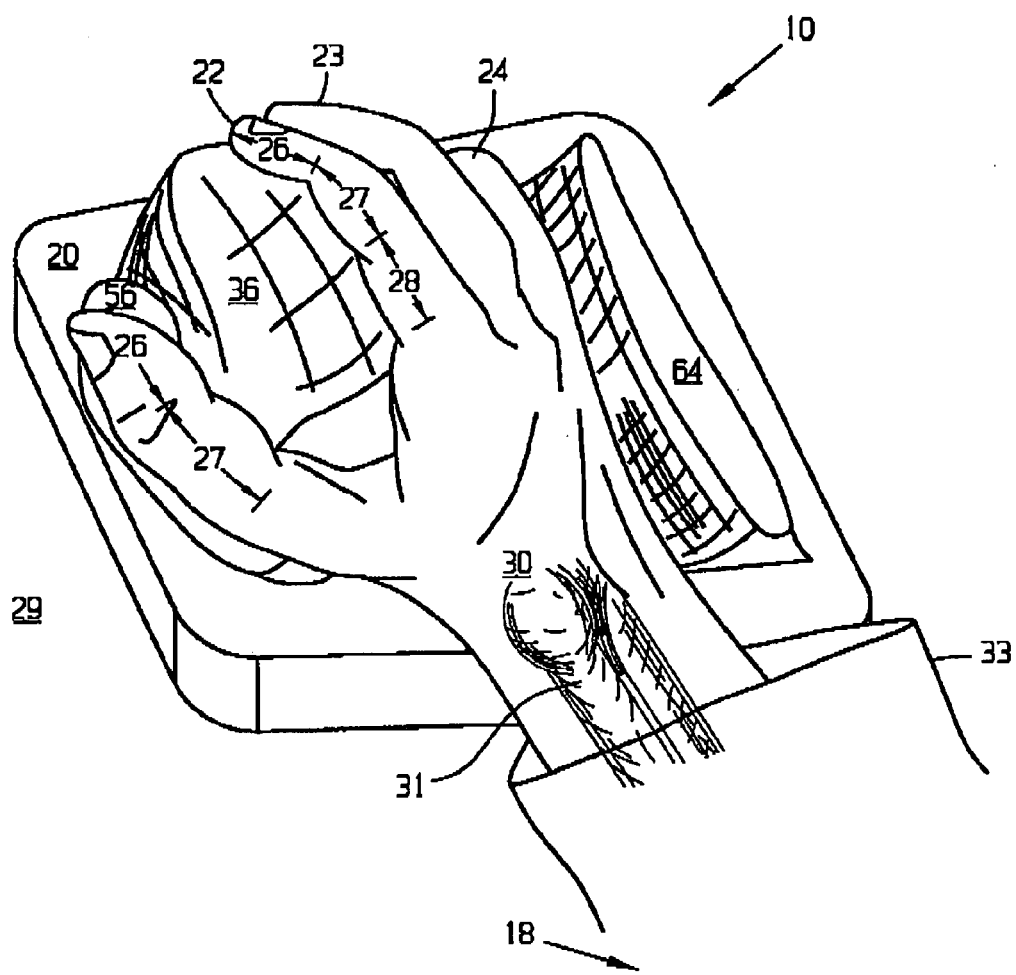
FIG. 2D depicts a hand resting upon an apparatus according to the present invention.

FIG. 2D depicts the position of the hand according to a preferred embodiment of the present invention. As shown, the hand 9 is in an handshake position, does not require gripping or clawing and keeps your mousing hand 9 in an orthopaedically neutral or untwisted position. The mouse 10 supports the wrist 30 and the hand 9. This means you do not drag the weight of your hand on your wrist, there is no longer the need to constantly grip with fingers and thumb, your hand and wrist are never in contact with the mousing area. There is also no need to hold fingers on buttons, thus providing relaxed finger position, where the fingers can adopt their normal resting position. The mouse 10 is longer and taller than non-biomechanical mice, that's why it doesn't hurt. The Extra Size gives you support that no mouse has provided before. This extra area needed is normally occupied by the hand, wrist and lower forearm. The actual 'footprint', the mousing area required, is only marginally bigger though.

Another problem that the present invention solves is that of going out of sync. It is well known Within the art that a mouse may go out of sync with the screen cursor. If the mouse is bottom left of the mouse mat and the screen cursor is bottom left of the screen, moving the mouse to top right of the mouse mat moves the cursor top right of the screen, all is in sync. However, if you run off your mouse mat or use certain programs the relative position of mouse on mat and cursor on screen can change, and go out of sync. For instance in Windows there is something called "Smart Move". If you click on something (an icon) while at the top right of the screen that opens up another window, for instance to save a file, then when the new window is opened, usually in the center of the screen, Smart Move jumps the cursor from where you clicked (top right in this case) to the save button (icon) that has now appeared in the center of the screen, independently of movement of the mouse. Consequently the mouse is still positioned on the mouse mat at top right but the cursor is now sat in the middle of the screen and so is out of sync, positionally, relative to the mouse on the mat location. As a result if you now move your mouse to the center of the mouse mat, the cursor goes to the bottom left of the screen. This would require the physical effort of lifting and repositioning the mouse on the mouse mat.

The present invention, though, solves this problem with the sensor 67 (as shown in FIG. 2A). If you cease contact with the sensor 67 or take your hand off, you can now slide the mouse over the mouse mat to the center without sending the cursor to the bottom left, in this way you re-sync the relative position of one to the other without having to lift the mouse, something that most disabled can do even when they can't lift a mouse. Sliding is obviously much less stressful than lifting. The mouse 10 may also be operated in conjunction with AutoClick™ mouse-control software, a sensor on or operatively connected to the mouse 10 detects when the hand 20 of the user has been lifted off of the mouse. This method then immobilizes the computer's cursor stopping accidental movement of the cursor onto another area of the screen which without the AutoClick™ software could produce an undesired action. Such a sensor could include but is not limited to detection of pressure or temperature. Where sensors include a fingerprint scanner, a retina scanner, or other biometric sensors, the mouse (and cursor and the whole computer) can remain inactivated until such biometric sensors identify that the proper (authorized) user has replaced his hand upon the mouse.

It is envisioned that a number of different sensors 67 and actuators may be used to activate and deactivate mousing in response to a trigger. The sensor 67 may perform all of the tasks of an actuator. However, an actuator can not sense the presence of a users hand. Traditionally, actuators are the mouse buttons and the functions may include normal functions of clicking actuators of pointing devices known within the art. The term sensor 67 though, are actuators that also sense a trigger. For instance, other sensors may include a fingerprint scanner (allows mousing only when the proper fingerprint is present), biometric scanner (biometrics is a means of identifying a person by measuring a particular physical or behavioral characteristic and later comparing it to a library of characteristics belonging to many people) or a retina scanner (detects the retina of an individual). In response to a trigger, the sensor allows mousing or scrolling, activates or deactivates mousing action. This may be accomplished through software or a simple switch that is closed when a trigger is present, activating mousing and opened when the trigger is not present, deactivating mousing. It is also be envisioned that the functions of actuators of the device may be controlled by voice recognition software. In this instance, the microphone is the sensor and a microphone is mounted on the device as a voice recognition receiver. The benefits of the use of sensorial interrogation of contact could be extended to other applications such as voice recognition software so as to vary the menu of activation words and reduce them thereby increasing the accuracy in use of such software. For example when the hand contact sensor is activated the word commend 'Double' or 'Left' or Right' could be introduced, such that the system knowing that the hand is in contact with the mouse would only select form these obvious mouse choices, or such other options as may evolve but relate specifically to and are part of a menu of mouse use, which would be active while the hand is in contact with the mouse and would be deactivated and the standard text editing menu reactivated when the hand is not in contact with the mouse. A spectacle or earpiece may also operate in connection with the series of actuators to act as transmitters. The movement of the head and transmitter relays a signal.

Figure 3:
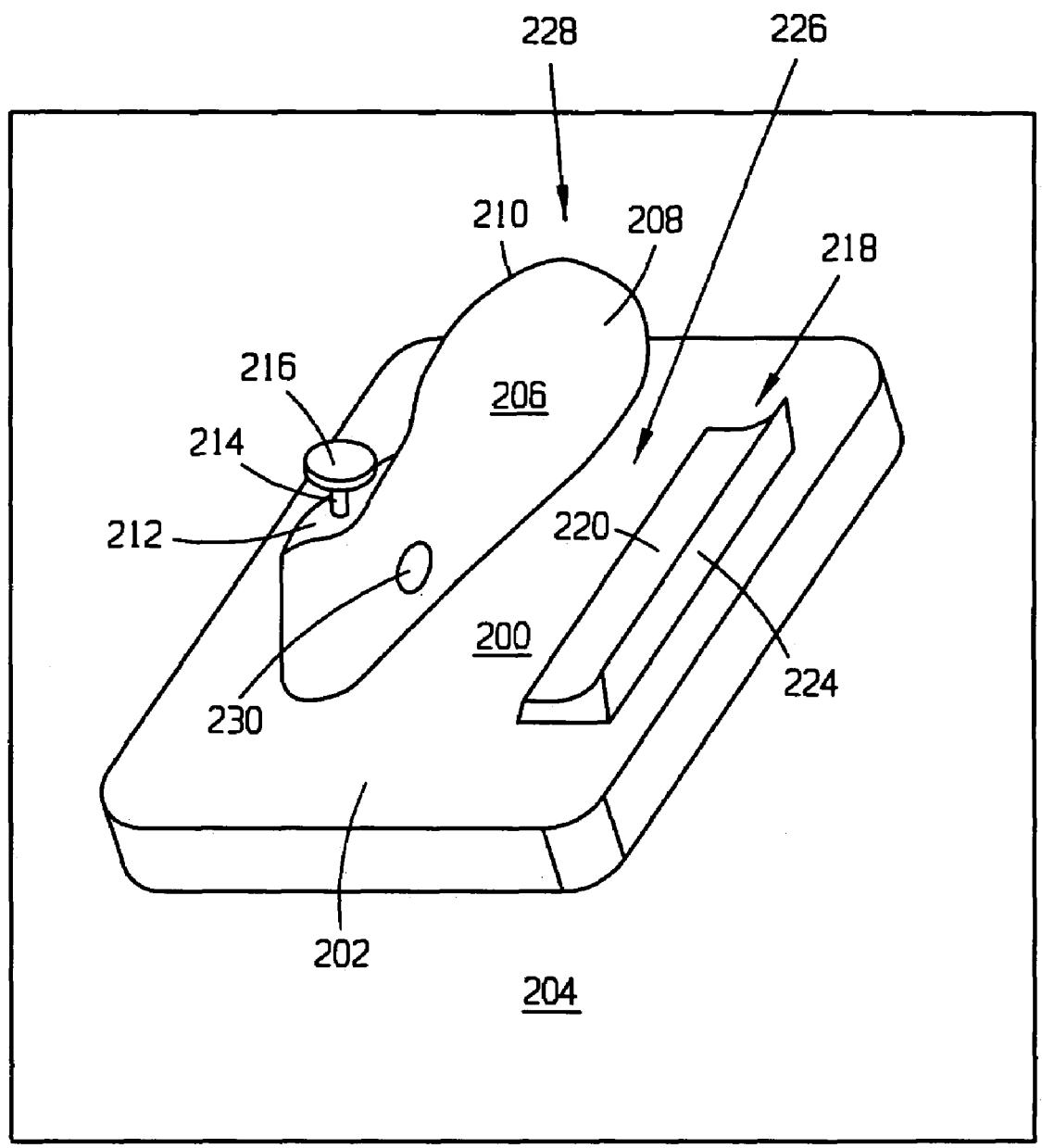
FIG. 3 depicts a mouse according to the present invention.

According to yet another embodiment, as shown in FIG. 3, an ergonomic mouse apparatus is disclosed comprising: a base with a bottom side and a top side 202, wherein the bottom side is adapted to contact a planar working surface 204; a first housing 206 in fixed communication with the top side 202 of the base 200, having: an inner surface 208 comprising a plurality of continuous curved regions extending the length of the inner surface in fixed connection with the top side 202 of the base 200; an outer surface 210 opposing the inner surface 208, having a plurality of continuous curved regions including a thumb ledge region 212, a thumb height adjuster 214 in fixed communication with the thumb ledge region 212 and a concave thumb rest 216; a second housing 218 in adjustable communication with the top side 202 of the base 200 in communication with the outer portion of the hand of the user, wherein the second housing 218 includes a second inner surface 220 having a second plurality of curved regions and a second outer surface 224 opposing the second inner surface 220, wherein the plurality of continuous curved regions of the inner surface 208 of the first housing 206 and the plurality of continuous curved regions of the inner surface 220 of the second housing 218 form a mound portion 228 and a gully portion, 226 so that at least a portion of the wrist, hypothenar eminence and outer portion of the little finger of a user rests in the gully portion 226, and the fingers may easily make contact with the mound portion such that the mouse is easily maneuvered while the hand is in a natural and relaxed position; and at least one sensor 230 that can sense the presence and size of a users hand, adjusting the position of first housing and second housing and only allowing for mousing when the users hand is present. The thumb rest may be vertically adjustable manually by the user or vertically adjustable automatically by an electromechanical actuator within the mouse device. Where the thumb rest is vertically adjustable, there may be a thumb height adjuster which may be an adjustment screw located in the thumb ledge region and in substantially vertical adjustable communication with the thumb rest.

Figure 4:
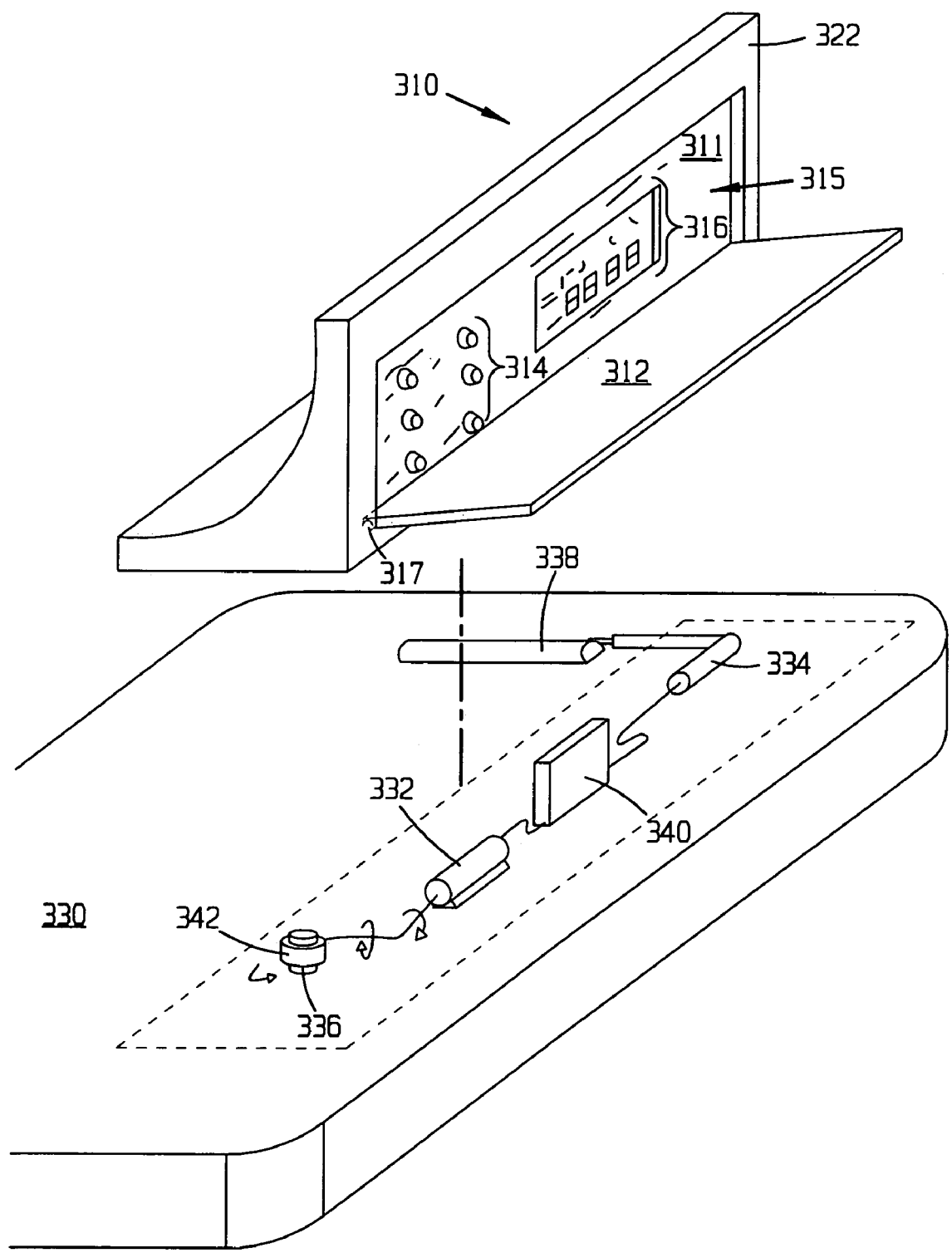
FIG. 4 depicts a schematic of the outer housing and actuation device.

The second housing 218 is adjustable in a substantially horizontal direction. The second housing 218 may be manually adjustable by the user in a substantially horizontal direction relative to the first housing 206. The relative positions of the first housing 206 and the second housing 208 may also be dynamically adjusted by actuators acting under the control of a computer program. The second housing 218 may be adjustable in a substantially vertical direction and automatically by an electromechanical actuator within the mouse device. FIG. 4 depicts an embodiment utilizing small electromechanical motors including solenoids (332, 334, 338), or other actuating members (336, 342) within the mouse 230, which can automatically and dynamically control the position of the second housing 310 relative to the base 330 of the mouse device 10, according to dynamically ergonomically determined or preset optimal positions relating to different users. Such surface-positioning motors could be controlled by an internal microprocessor 340 using information derived from biometric sensors within the mouse 230 or by signals received from an operatively attached computer (not shown). This would facilitate adjustment of the surfaces (e.g., 42, 44, 66) to the varying hand structure of different users. Settings for each user can be programmed into the mouse 230 (through an operatively attached computer) or an internal control-panel 315 (e.g., disposed on the second outside surface 322 under a cover 312 connected by a hinge 317) including control-buttons 314, a status-display 316 or other need input and output devices.

There may also be a supportive material in fixed contact with the first housing, base, and/or second housing. There may be a programmably motorized system in electrical communication with the second housing, as. There may also be a biometric sensor adapted to continuously identify the present user of the mouse and adjust said second housing accordingly. There may also be a sensor incorporated within the mouse adapted to continuously detect contact of the user's hand with a surface the mouse and only allow for mousing when the user's hand is present.

Also envisioned is a method for providing an automatically adjustable grip-less and biomechanically low load mouse. The method comprising: step 1000 providing a base with a top portion and a bottom portion, wherein the top portion has a first cavity therein an first adjustment assembly, a second cavity containing therein second adjustment assembly and the bottom portion is substantially flat for movement across a planar surface.

Step 1002 providing a first housing with an inner surface and outer surface, wherein the inner surface and the outer surface have a plurality of curved regions adapted to receive a portion of the of a users hand, wherein the first housing contains a portion of the first adjustment assembly and the first adjustment assembly senses the size and placement of the users hand and adjusts the first housing accordingly.

Step 1004 providing a second housing with a second inner surface and a second outer surface, wherein the second inner surface and the second outer surface have a plurality of curved regions for the receipt of a portion of the users hand, wherein the second housing contains a portion of the second adjustment assembly and the second adjustment assembly senses the size and placement of a users hand and adjusts the second housing accordingly.

Step 1006 may be providing a sensor contained within the mouse and in communication with a computer controlled program, wherein the sensor detects the presence of a users hand and allows the mouse to operate only when the users hand is in communication with the mouse.

Step 1008 forming a mound portion and a fully portion with the first housing and the second housing form. The gully portion adapted to received at least a portion of one of the hypothenar eminence, wrist and outer portion of the little finger. Step 1010 providing a vertically adjustable thumb rest extending from the outer portion of the first housing. Step 1012 automatically sensing the position of the users thumb and adjusting the thumb rest. Step 1014 automatically sensing the position of the users hand and adjusting the first housing accordingly. Step 1016 automatically sensing the position of said users hand and adjusting said second housing accordingly. Step 1018 providing a biometric sensor adapted to continuously identify the present user of the mouse and adjust the first housing and the second housing accordingly.

It is also envisioned to provide for motors, which may control the motion of the adjustment screws which in turn adjusts the relative orientation of the device to the user's hand, which could be facilitated by controls on the device or via a software input routine so as to preset the position relating to different users.

It is commonly the case, especially in those with hand injuries, to use two mice, one for each hand. It is therefore a necessary part of the objective that the device herein described is produced in diastereoisomeric or mirror image, forms that accommodate and suit the varying biomechanical dexterity of the left and right hands. As well as covering the issues of left and right then the utility of the hand sensor herein described will so act to limit the accidental involvement of the unused mouse, in such two mouse operating systems, so that only the mouse that is being used and in contact with the sensor will prescribe the users movement on the screen, even if the unused mouse is knocked or moved during that process. In addition to dexterity the possibility to manufacture devices to different size is also consider on the basis of the demographics of the human population and the possibility that the degree of adjustment possible herein in may not suit or accommodate all eventualities or the cost effectiveness of manufacture in some cases.

Additionally the utility of the sensor also lends itself to the development of the use of the computer mouse to choose from alphanumeric characters displayed on the screen by moving a mouse and clicking on them, to build words and sentences. This is as an alternative to using a keyboard for typing. Such software now inexistence relies upon the single hand of the user to move a conventional mice, requiring excessive biomechanical load so now creating more strain on the users one hand. The device and features herein described, not only allow for 'Mouse Typing' software to be used without applying a biomechanical burden to the fingers, hand and wrist but also allow for the software to be used by either or both hands and thereby distributing the what biomechanical load there is, predominantly now in the upper arm muscles. Not only is it possible for the full alphanumeric selection to be accessible by either hand, it is now possible to devise a software system in which only certain alphanumeric characters are assigned to each hand and so to effectively develop a "Mouse Typing" qwerty equivalent layout. The use of sensors would then inform the software of a single handed use, so displaying the full alphanumeric options when called upon or in the event of the detection of two hands on two mice the new 'Mouse Type' layout, with the alphanumerics assigned to each mouse so as to parallel the layout and function as if on a qwerty keyboard. Additional contact sensors could also be used for the selection of case and other internal application features.

I claim:

1. A mouse apparatus that does not require gripping so having a low biomechanical load, said apparatus comprising:

a base, configured to be placed on a working surface, a first housing, wherein said first housing has an inner surface and an outer surface, said outer surface having a thumb ledge; and a second housing with a bottom surface, a second inner surface, and a second outer surface, wherein said bottom surface is in adjustable communication with said base to receive a mouse users palm in contact with said first housing and a portion of said mouse users hyperthenar eminence is in contact with said second housing.

2. An apparatus as in claim 1, further comprising a thumb rest protruding from said thumb ledge.

3. An apparatus as in claim 2, wherein said thumb rest includes a concave thumb ledge.

4. An apparatus as in claim 2, wherein said thumb rest is vertically adjustable manually by the user.

5. An apparatus as in claim 2, wherein said thumb rest is adjustable automatically by an electromechanical actuator within the mouse device.

6. An apparatus as in claim 1, wherein said second housing is adjustable in a substantially horizontal direction.

7. An apparatus as in claim 1, wherein said second housing is manually adjustable by the user in a substantially horizontal direction relative to said first housing.

8. An apparatus as in claim 1, wherein the relative positions of said first housing and said second housing can be dynamically adjusted by actuators acting under the control of a computer program.

9. An apparatus as in claim 1, further comprising a connector device.

10. An apparatus as in claim 9, wherein said connector device is selected from the group consisting of interlocking arches, a hinge, adjustable screw, screw, frictional positioner, pins, and hinge and pin set.

11. An apparatus as in claim 1, wherein said second housing is automatically adjustable in a substantially vertical direction by an electromechanical actuator within the mouse device.

12. An apparatus as in claim 1, further comprising a hand-cushioning supportive material in fixed contact with at least one of said first housing, said base, and said second housing.

13. An apparatus as in claim 12, wherein said hand-cushioning supportive material is chosen from the group consisting of foam and gel.

14. An apparatus as in claim 1, wherein said inner surface comprises a plurality of continuous curved regions extending the length of said inner surface and said second inner surface comprises a second plurality of curved regions so as to form a mound portion and a gully portion.

15. An apparatus as in claim 1, further comprising at least one sensor that, in response to a trigger, activates or deactivates a mousing action.

16. An apparatus as in claim 1, further comprising a sensor that can sense the presence of a users hand and allow for mousing when the users hand is present.

17. An apparatus as in claim 1, further comprising a sensor wherein said sensor may be used to scroll the screen cursor in response to hand movement.

18. An ergonomic computer mouse for translation over a horizontal stationary surface, said mouse comprising:

a generally horizontal bottom surface for stably and translatably positioning said mouse over said horizontal surface;

a first housing attached over said bottom surface, said first housing having an inner surface and an outer surface, wherein said inner surface has a plurality of curved regions and said outer surface has a thumb-supporting surface;

a second housing movably attached over said bottom surface, said second housing having a second inner surface and a second outer surface, said second inner surface having a plurality of curved regions, wherein said inner surface of said first housing and said second inner surface form a mound region and a gully region, so that a portion of the hand of the user rests upon the mound region and a portion of the hand is in communication with said second housing to allow mousing while the hand is in a natural and relaxed position.

19. An apparatus as in claim 18, wherein said thumb-supporting surface includes a concave thumb ledge.

20. An apparatus as in claim 18, wherein said thumb rest is vertically adjustable manually by the user.

21. An apparatus as in claim 18, wherein said thumb rest is vertically adjustable automatically by an electromechanical actuator within the mouse device.

22. An apparatus as in claim 18, wherein said second housing is adjustable in a substantially horizontal direction.

23. An apparatus as in claim 18, wherein said second housing is manually adjustable by the user in a substantially horizontal direction relative to said first housing.

24. An apparatus as in claim 18, wherein the relative positions of said first housing and said second housing can be dynamically adjusted by actuators acting under the control of a computer program.

25. An apparatus as in claim 18, further comprising a connector device.

26. An apparatus as in claim 25, wherein said connector device is selected from the group consisting of interlocking arches, a hinge, adjustable screw, screw, frictional positioner, pins, and hinge and pin set.

27. An apparatus as in claim 18, wherein said second housing is adjustable in a substantially vertical direction and automatically by an electromechanical actuator within the mouse device.

28. An apparatus as in claim 18, further comprising a hand-cushioning supportive material in fixed contact with at least one of said first housing, said base, and said second housing.

29. An apparatus as in claim 18, further comprising at least one sensor that, in response to a trigger, activates or deactivates a mousing action.

30. An apparatus as in claim 18, further comprising a sensor that can sense the presence of a users hand and allow for mousing when the users hand is present.

31. An apparatus as in claim 18, further comprising a sensor, wherein said sensor may be used to scroll the screen cursor in response to hand movement.

32. An ergonomic mouse apparatus, said apparatus comprising:

a base with a bottom side and a top side, wherein said bottom side is adapted to contact a planar working surface;

a first housing in fixed communication with said top side of said base, having:

an inner surface comprising a plurality of continuous curved regions extending the length of said inner surface in fixed connection with said top side of said base;

an outer surface opposing said inner surface, having a plurality of continuous curved regions including a thumb ledge region, a thumb height adjuster in fixed communication with said thumb ledge region and a concave thumb rest;

a second housing in adjustable communication with said top side of said base in communication with the outer portion of the hand of said user, wherein said second housing includes a second inner surface having a second plurality of curved regions and a second outer surface opposing said second inner surface, wherein said plurality of continuous curved regions of said inner surface of said first housing and said plurality of continuous curved regions of said inner surface of said second housing form a mound portion and a gully portion, so that at least a portion of the wrist, hypothenar eminence and outer portion of the little finger of a user rests in said gully portion, and at least a portion of the hand may easily make contact with said mound portion, said gully portion and said second housing such that said mouse is easily maneuvered while the hand is in a natural and relaxed position; and a sensor that can sense the presence and size of a users hand, adjusting the position of said first housing and second housing and only allowing for mousing when the users hand is present.

33. An apparatus as In claim 32, wherein said thumb rest is vertically adjustable manually by the user.

34. An apparatus as in claim 32, wherein said thumb rest is vertically adjustable automatically by an electromechanical actuator within the mouse device.

35. An apparatus as in claim 32, wherein said second housing is adjustable in a substantially horizontal direction.

36. An apparatus as in claim 32, wherein said second housing is manually adjustable by the user in a substantially horizontal direction relative to said first housing.

37. An apparatus as in claim 32, wherein the relative positions of said first housing and said second housing can be dynamically adjusted by actuators acting under the control of a computer program.

38. An apparatus as in claim 32, further comprising a connector device selected from the group consisting of interlocking arches, a hinge, adjustable screw, screw, frictional positioner, pins, and hinge and pin set.

39. An apparatus as in claim 32, wherein said second housing is adjustable in a substantially vertical direction and automatically by an electromechanical actuator within the mouse device.

40. An apparatus as in claim 32, wherein said thumb height adjuster is an adjustment screw located in said thumb ledge region in substantially vertical adjustable communication with said thumb rest.

41. An apparatus as in claim 32, further comprising a supportive material in fixed contact with at least one of said first housing, said base, and said second housing.

42. An apparatus as in claim 32, further comprising a programmably motorized system in electrical communication with said second housing.

43. An apparatus as in claim 32, further comprising:
a biometric sensor adapted to continuously identify the presence user of the mouse and adjust said second housing accordingly.

44. An apparatus as in claim 32, further comprising:
at least one sensor incorporated within said mouse adapted to continuously detect contact of the users hand with a surface the mouse and only allow for mousing when the users hand is present.

45. A method for providing an automatically adjustable grip-less and biomechanically low load mouse, said method comprising the steps of:

providing a base with a top portion and a bottom portion, wherein said top portion has a first cavity therein an first adjustment assembly, a second cavity containing therein second adjustment assembly and said bottom portion is substantially flat for movement across a planar surface;

providing a first housing with an inner surface and outer surface, wherein said inner surface and said outer surface have a plurality of curved regions adapted to receive a portion of the of a users hand, wherein said first housing contains a portion of said first adjustment assembly and said first adjustment assembly senses the size and placement of said users hand and adjusts said first housing accordingly; and providing a second housing with a second inner surface and a second outer surface, wherein said second inner surface and said second outer surface have a plurality of curved regions for the receipt of a portion of said users hand and at least a portion of said users hand is in communication with said first housing and said second housing, wherein said second housing contains a portion of said second adjustment assembly and said second adjustment assembly senses the size and placement of a users hand and adjust said second housing accordingly.

46. A method as in claim 45, further comprising the step of;
providing a sensor contained within said mouse and in communication with a computer controlled program, wherein said sensor detects the presence of a users hand and allows said mouse to operate only when said users hand is in communication with said mouse.

47. A method as in claim 45, wherein said first housing and said second housing form a mound portion and a gully portion, said gully portion adapted to received at least a portion of one of the hypothenar eminence, wrist and outer portion of the little finger.

48. A method as in claim 45, further comprising the step of:
providing a vertically adjustable thumb rest extending from said outer portion of said first housing.

49. A method as in claim 45, further comprising the step of:
automatically sensing the position of said users thumb and adjusting said thumb rest.

50. A method as in claim 45, further comprising the step of:
automatically sensing the position of said users hand and adjusting said first housing accordingly.

51. A method as in claim 45, further comprising the step of:
automatically sensing the position of said users hand and adjusting said second housing accordingly.

52. A method as in claim 45, further comprising the step of:
providing a sensor that may be used to activate or deactivate mousing.

53. A method as in claim 45, further comprising the step of:
providing a biometric sensor adapted to continuously identify the present user of the mouse and adjust said first housing and said second housing accordingly.

* * * * *